Dec. 15, 1931.    H. R. HYDE    1,836,664
ADVERTISING SIGN EXHIBITOR
Filed Jan. 8, 1931    3 Sheets-Sheet 1

INVENTOR.
H. R. Hyde.
BY
ATTORNEY.

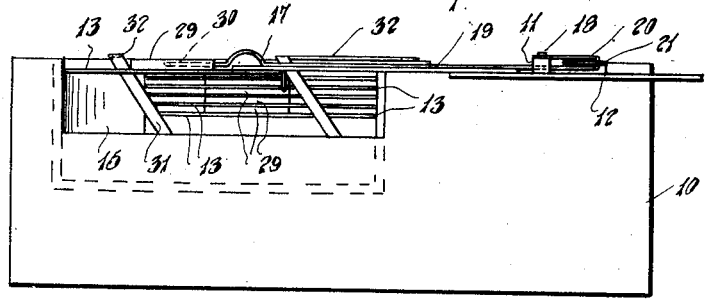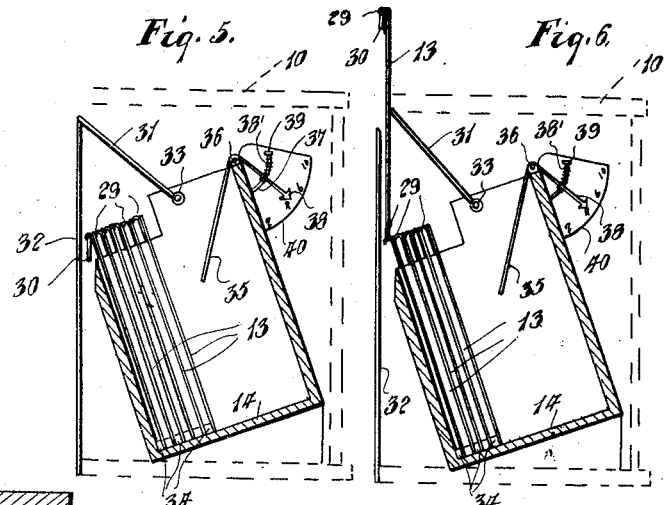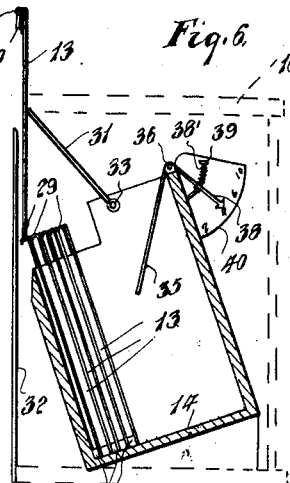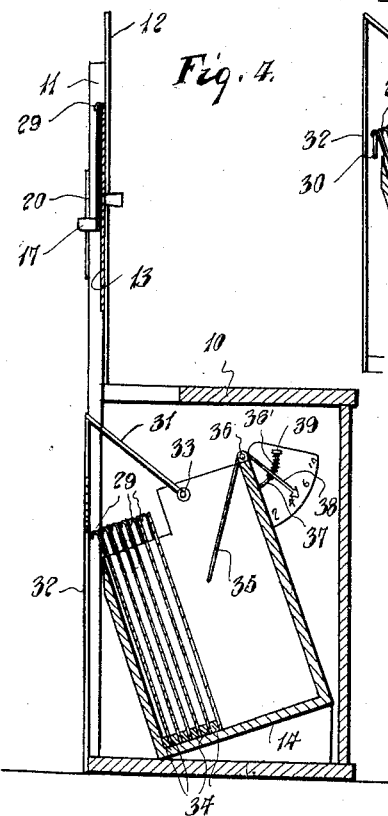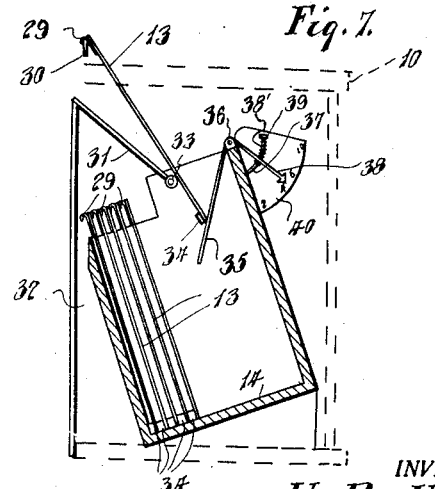

Dec. 15, 1931.                    H. R. HYDE                    1,836,664
                            ADVERTISING SIGN EXHIBITOR
                     Filed Jan. 8, 1931          3 Sheets-Sheet 3

INVENTOR.
H. R. Hyde
BY
ATTORNEY.

Patented Dec. 15, 1931

1,836,664

UNITED STATES PATENT OFFICE

HERBERT R. HYDE, OF ALBUQUERQUE, NEW MEXICO

ADVERTISING SIGN EXHIBITOR

Application filed January 8, 1931. Serial No. 507,469.

This invention relates to an advertising device designed to exhibit advertising signs or cards successively and continuously.

A particular object is to provide a mechanism adapted to elevate or correspondingly move a card and then return to normal position, releasing such card and engaging and elevating the succeeding card.

Another object is to provide a mechanism wherein a plurality of individual cards are used and which cards are exhibited from the front of the pack and returned to the rear of the pack, but being constantly urged toward the front of the pack.

The more specific objects and advantages will become apparent from a consideration of the description following taken in connection with accompanying drawings illustrating an operative embodiment.

In said drawings:—

Figure 3 is a plan view of the invention,

Figure 4 is a vertical sectional view taken on the line 4—4 of Figure 2,

Figure 8:
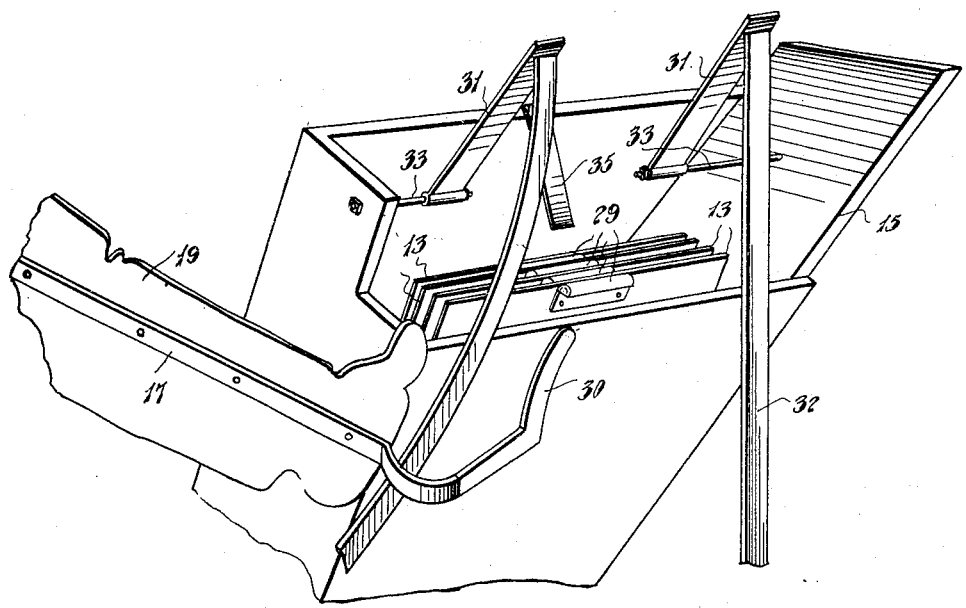
Figure 9:
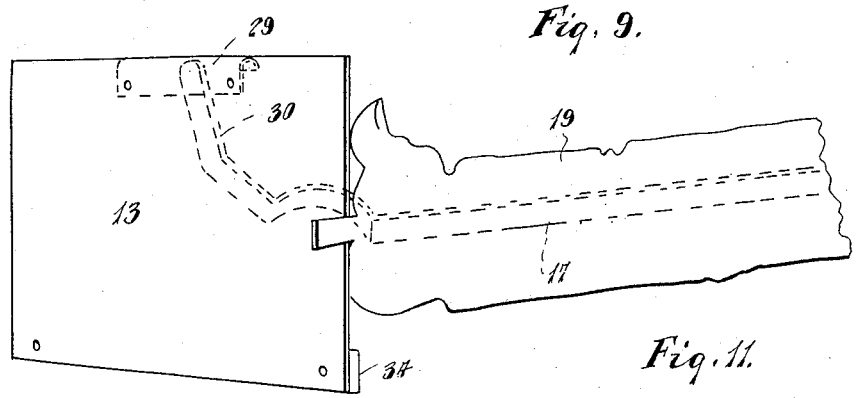
Figure 11:
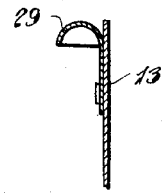
Figure 10:
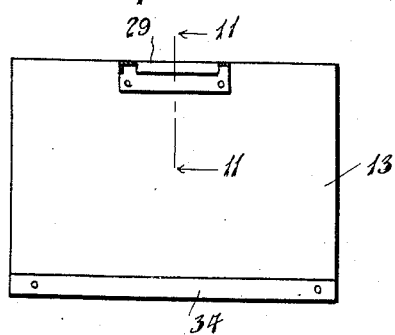

Figures 5, 6 and 7, are partial vertical sectional views similar to Figure 4 but showing the apparatus in different stages of operation, Figure 8 is a detail perspective view of part of the apparatus, Figure 9 is a detail perspective view showing one of the signs and elevating member alone, Figure 10 is a rear view of one of the signs, and Figure 11 is a detail sectional view taken on the line 11—11 of Figure 10.

Referring specifically to the drawings, 10 designates a counter having a standard or support 11 rising therefrom and having the upper part thereof finished at 12 by a suitable panel to simulate a man or any other object desired. The device may be built of any desired size but is preferably of such size that the representation 12 is that of a man and the counter 10 of usual store size.

Figure 1:
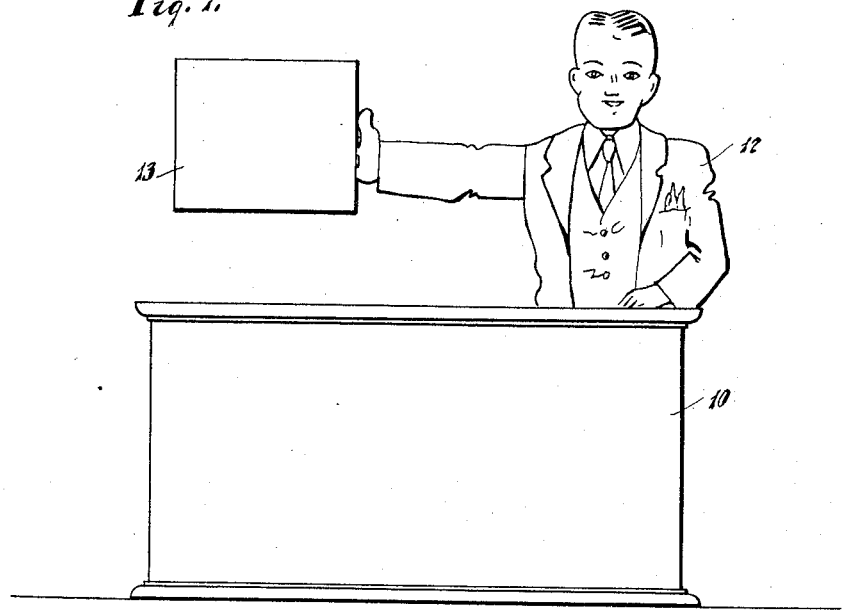
Figure 1 is a view showing the invention in front elevation.
Figure 2:
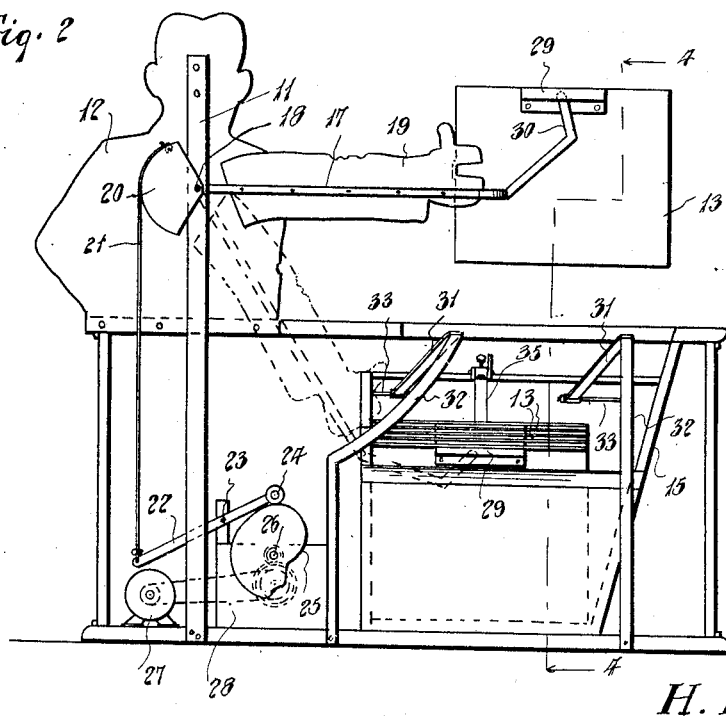
Figure 2 is a view of the invention in rear elevation.

The device is adapted to successively display individual signs or cards 13 in the position of Figures 1 and 2.

Said individual signs or cards 13 are arranged within an inclined receptacle 14 contained within the counter 10 and which signs fall by gravity against the rear wall of the container, also being guided into engagement with the left hand wall of the container in Figure 2, by the right hand wall 15 thereof which is inclined for that purpose.

In order to move the sign 13, an arm 17 is pivoted at 18 to the support 11 and to render the arm more realistic, a panel 19 may be fastened thereto in simulation of the human arm. At the rear end, arm 17 has an enlargement or crank 20 to which a flexible element 21 in the form of a cable or strap is fastened which is also fastened to a lever 22 pivoted at 23 within the counter. Such lever 22 at its free end has a roller 24 in engagement with the edge of a cam 25 which is driven by a shaft 26 driven from an electric motor 27 or the equivalent, mounted within the counter, and through the medium of a gear case or transmission 28 also within the counter.

Each of the signs 13, has an inverted hook or the equivalent 29 which is adapted for engagement by a free end or portion 30 of arm 17.

The arm 17 is movable downwardly from the full line position shown in Figure 2 to the dotted line position shown in the same figure, with portion 30 having sort of cam engagement with the adjacent hook 29, displacing the sign rearwardly until the portion 30 is past the adjacent hook 29 whereupon it will be in line with the opening of the hook. The driving mechanism of the arm then causes the arm to move upwardly, the same at portion 30 engaging the hook 29 as shown in Figure 5, moving the engaged sign upwardly, displacing pivoted guides or fingers 31, as shown in Figure 6, and finally reaching the position shown in Figure 4, corresponding to that of Figures 1 and 2. The time or dwell that the signs remain in the position of Figures 1, 2 and 4, is controlled by the shape of the cam 25.

After the signs 13 are raised above the fingers 31, the same move by gravity to lowermost position into engagement with supporting bars 32 fastened at the rear of the counter. The pivots of the fingers 31 may be in the nature of rods 33 secured to the holder 14. Thus when the arm 17 lowers, the sign carried thereby will engage the fingers 31 and as shown in Figure 7, be deflected away from the rear edge of the holder 14 and to the front in advance of the others. In this way, the signs move successively to the rear of the holder 14 and are successively, during the continuous operation of the device, displayed as in Figure 1.

It is obvious that any desired number of the signs may be employed and that they may be of any suitable material. For instance, they may be of pasteboard with the hooks 29 of metal and be reenforced with a strip of wood or other material at 34, to give the same proper balance and weight.

A forward deflector coacts with the fingers 31, the same being designated 35 and pivoted at 36 to the holder or container 14. This deflector 35 is adapted to be adjusted to different positions according to the number of signs used and to the position most advantageous for overbalancing and guiding the signs in their return into the holder. To this end, an arcuate rod 37 passes freely through an indicator arm 38 carried by the deflector 35 and which arm moves against the tension of a spring 38' which is varied through adjustment of a nut 39 on the rod 37. The adjustment of the nut 39 moves the spring to different positions, varying accordingly the position of the deflector 35 or permitting it to move to different positions. The indicator 38 coacts with an indicator plate 40 having calibrations thereon to guide the operator in positioning the deflector in the most advantageous position according to the number of signs used.

I claim as my invention:—

1. An exhibitor of the class described comprising a holder disposed at an inclination, signs in said holder normally movable against one wall thereof because of said inclination, means including an arm to engage and move the sign in engagement with said wall to display position, said means being returnable to sign-engaging position, and means during the return movement of the arm engageable therewith to guide the signs to the rear of the holder.

2. An exhibitor of the class described comprising a holder disposed at an inclination, signs in said holder normally movable against one wall thereof because of said inclination, means including an arm to engage and move the sign in engagement with said wall to display position, said means being returnable to sign-engaging position, and means during the return movement of the arm engageable therewith to guide the signs to the rear of the holder, said second mentioned means being displaceable by a sign as it is moved to projected position.

3. An exhibitor of the class described comprising a holder disposed at an inclination, signs in said holder normally movable against one wall thereof because of said inclination, means including an arm to engage and move the sign in engagement with said wall to display position, said means being returnable to sign-engaging position, means during the return movement of the arm engageable therewith to guide the signs to the rear of the holder, said second mentioned means being displaceable by a sign as it is moved to projected position, and a deflector to coact with returned signs, said deflector being adjustably mounted for disposition according to the number of signs employed.

4. An exhibitor of the class described comprising a holder disposed at an inclination, signs in said holder normally movable against one wall thereof because of said inclination, means including an arm to engage and move the sign in engagement with said wall to display position, said means being returnable to sign-engaging position, and means during the return movement of the arm engageable therewith to guide the signs to the rear of the holder, said second mentioned means being displaceable by a sign as it is moved to projected position, bars engageable by said means in normal position, and said arm having a deflected portion whereby it may avoid the adjacent bar in its movement to sign-engaging position.

5. An exhibitor of the class described comprising a holder disposed at an inclination, signs in said holder normally movable against one wall thereof because of said inclination, means including an arm to engage and move the sign in engagement with said wall to display position, said means being returnable to sign-engaging position, and means during the return movement of the arm engageable therewith to guide the signs to the rear of the holder, said second mentioned means being displaceable by a sign as it is moved to projected position, bars engageable by said means in normal position, said arm having a deflected portion whereby it may avoid the adjacent bar in its movement to sign-engaging position, a support to which said arm is pivoted, a flexible member connected to said arm, a lever to which the flexible member is connected, a cam in operative engagement with said arm, and means to drive the cam.

In testimony whereof I affix my signature.

HERBERT R. HYDE.